Nov. 10, 1959 R. D. COOKSLEY 2,912,009
REMOTELY CONTROLLABLE, VALVE OPERATING DEVICE
Filed April 22, 1957 4 Sheets-Sheet 1

INVENTOR.
RALPH D. COOKSLEY
BY
Woodhams Blanchard & Flynn
ATTORNEYS

Nov. 10, 1959 R. D. COOKSLEY 2,912,009
REMOTELY CONTROLLABLE, VALVE OPERATING DEVICE
Filed April 22, 1957 4 Sheets-Sheet 2

INVENTOR.
RALPH D. COOKSLEY
BY
Woodhams Blanchard & Flynn
ATTORNEYS

INVENTOR.
RALPH D. COOKSLEY
BY
Woodhams Blanchard and Flynn
ATTORNEYS

Nov. 10, 1959  R. D. COOKSLEY  2,912,009
REMOTELY CONTROLLABLE, VALVE OPERATING DEVICE
Filed April 22, 1957  4 Sheets-Sheet 4

INVENTOR.
RALPH D. COOKSLEY
BY
Woodhams Blanchard & Flynn
ATTORNEYS

United States Patent Office 2,912,009
Patented Nov. 10, 1959

2,912,009

REMOTELY CONTROLLABLE, VALVE OPERATING DEVICE

Ralph D. Cooksley, Kalamazoo, Mich., assignor to General Gas Light Company, Kalamazoo, Mich., a corporation of Michigan Application April 22, 1957, Serial No. 654,174

13 Claims. (Cl. 137—623)

This invention relates in general to a device for operating a valve and, more particularly, to a valve operating device which is remotely controllable and which is capable of extremely rapid and reliable action.

In my application, Serial No. 570,903, I have set forth the construction for a valve capable of extremely rapid and reliable action, and capable of use under widely varying conditions. In further development of said valve, it was found to be desirable to render said valve operable by a remotely controllable device, which will be accurate and dependable, and which will be capable of easy modification to fit a variety of different purposes.

Accordingly, a principal object of the invention has been to provide a remotely controllable, valve operating device, which is extremely rapid and reliable in operation and which is adaptable to a wide variety of purposes and uses.

A further object of the invention has been to provide a valve structure adaptable for being actuated by power, which may be either electrical or pressure fluid.

A further object of the invention has been to provide a valve operating device, as aforesaid, wherein a portion of the electrical or pressure fluid operating means can be readily replaced by other means, such as resilient means, where other and more limited uses are desired.

A further object of the invention has been to provide a device, as aforesaid, which is adaptable for electromagnetic operation.

A further object of the invention has been to provide a device, as aforesaid, wherein the electromagnetic means provided may be of relatively small size, without jeopardizing the positive and reliable operation of the valve.

A further object of the invention has been to provide a valve structure, as aforesaid, in which the electromagnetic means actuates a magnetic member, which, in turn, moves independently of the valve structure for operating a pair of small pilot valves whose action, in turn, operates the main valve.

A further object of the invention has been to provide a device, as aforesaid, in which the stroke required to operate the pilot valves can be extremely short, without seriously impeding the flow of fluid through said main valve, and thereby enable the electromagnetic means to be relatively small, without interfering with the reliable, accurate and rapid operation of the valve.

A further object of the invention has been to provide a device, as aforesaid, which is adaptable, also to mechanical control and, when so adapted, can be operated by only a very small power input requirement, thereby rendering manual actuation of the mechanical control extremely easy and non-fatiguing.

A further object of the invention has been to provide a device, as aforesaid, wherein the stroke required of the electromagnetic means is extremely small, such as of the order of under 0.025 inch.

A further object of the invention has been to provide a device, as aforesaid, comprising parts of sufficient structural simplicity that they can be manufactured at extremely low cost.

A further object of the invention has been to provide a device, as aforesaid, wherein application of external power to the valve is required only for long enough to move the valve into a selected operating position, after which the fluid being handled by the valve is itself effective to hold the valve in such position.

A further object of the invention has been to provide a device, as aforesaid, wherein the pressure fluid being handled by the valve will cause said valve to assume one of its operating positions, and wherein it will be impossible for the valve to hold a position between, or out of, one of its operating positions.

A further object of the invention has been to provide a device, as aforesaid, which will move from one operating position to another operating position, such as from its fully open position to its fully closed position, in a period of time of the order of 50 milliseconds.

A further object of the invention has been to provide a device, as aforesaid, in which the valve may be made normally open or normally closed, as desired, merely by changing the position of its actuating apparatus, and without making any change whatsoever in the valve itself, or in its connections to an external system.

A further object of the invention has been to provide a device, as aforesaid, wherein the valve assembly being operated by said device can be arranged to control the flow of one type of pressure fluid, such as a liquid, while said valve assembly is being operated by another type of pressure fluid, such as a gas, and the two pressure fluids will be at all times positively isolated from each other.

A further object of the invention has been to provide a device, as aforesaid, which is of sufficient structural simplicity that it will operate under severe conditions for long periods of time and with only minimum maintenance.

A further object of the invention has been to provide a device, as aforesaid, in which a single design and size of electromagnetic assembly can be utilized with valve structures of a variety of different designs and sizes.

Other objects and purposes of the invention will be apparent to persons acquainted with apparatus of this general type upon reading the following specification and inspecting the accompanying drawings.

Assuming, for purposes of example, that the valve is being used to supply compressed air, or other pressure fluid, to a pressure fluid cylinder, the term, "supply conduit," will refer to the conduit supplying the high pressure from the source to the valve. Said high pressure may be either superatmospheric pressure, in the case of exhaust to the atmosphere, or atmospheric pressure, in the case of a vacuum exhaust. The term, "working conduit," will refer to the conduit connecting the valve to the supply side of a load, as a pressure fluid cylinder, being controlled by the valve. The term, "exhaust," refers to the port connecting the interior of the valve to the low pressure side of the system.

*General description*

In general, the valve structure herein disclosed in conjunction with the present invention includes a valve assembly having much of the same basic structure as is shown and claimed in my application, Serial No. 570,903. This consists of a valve rod having a diaphragm mounted thereon near each end thereof, and having a pair of spaced valve elements supported on said rod between said diaphragms. A housing surrounds said rod and defines a pair of spaced chambers receiving said diaphragms, each of said diaphragms being positioned to divide each of said chambers into two compartments. Said chambers are connected by a passageway through which said rod extends. Seats for said valves are provided at each end of said passageway. One port extends into one of said compartments on one side of the diaphragm therein, another port extends from the exterior of the valve into said center passageway, and a third port extends from the exterior of said valve into the other of said compartments on the side of the diaphragm adjacent said central passageway.

The present invention adds to the foregoing valve assembly the power responsive actuating means, as an electromagnetic means, and the pilot valves. The electromagnetic structure is arranged around a pair of cores, located on opposite sides of a magnetic member extending radially beyond said cores. To said member is connected a pair of pilot valves, which are associated with the passageways by which pressure fluid is conducted appropriately for opening and closing the main valve. Since a single size of pilot valves will be capable of serving main valves of a variety of different sizes, the pilot valve structure and the electromagnetic structure can be made standard for a wide range of main valve assemblies, with resulting economy in both the manufacturing and the servicing of said pilot valves.

*Detailed description*

Figure 1:
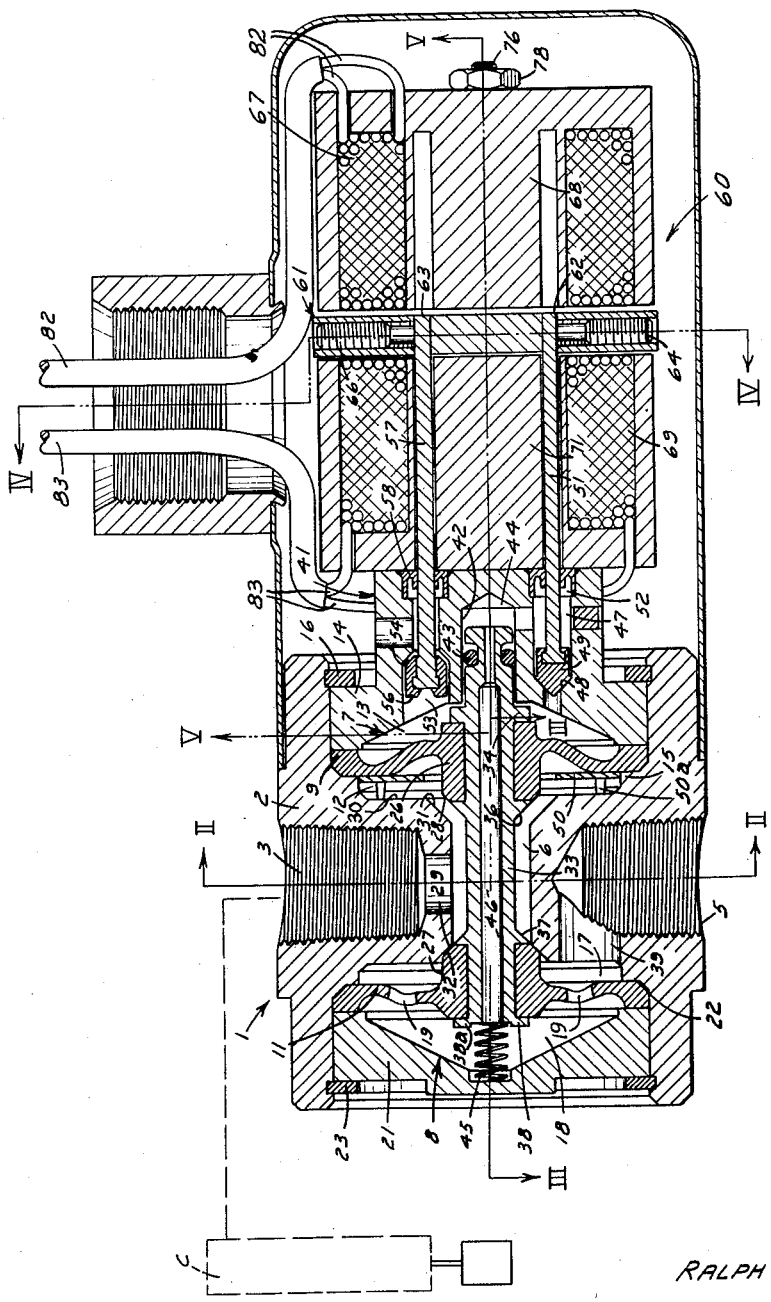
Figure 1 is a central, sectional view of a valve structure embodying the invention and designed for general utility.
Figure 2:
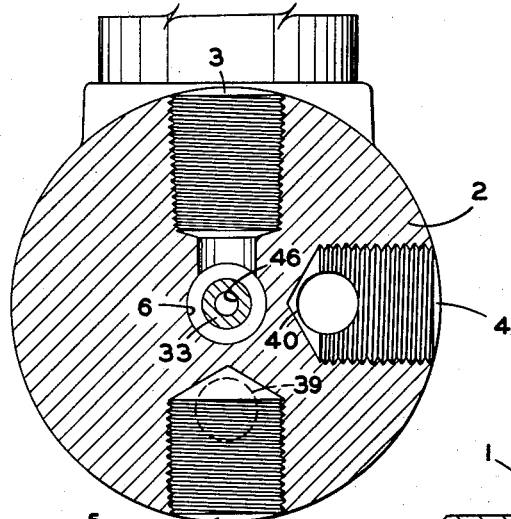
Figure 2 is a sectional view taken on the line II—II of Figure 1.
Figure 3:
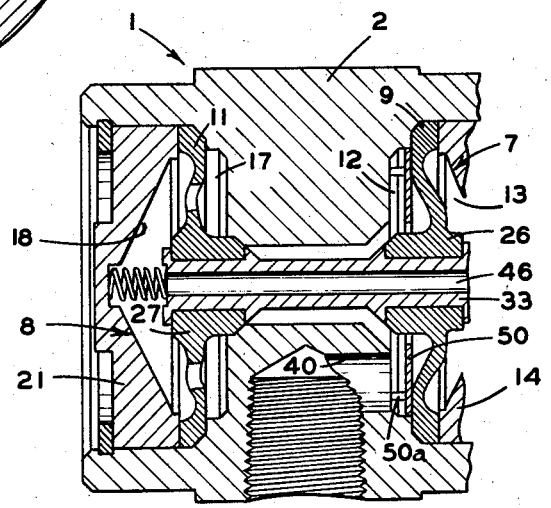
Figure 3 is a sectional view taken on the line III—III of Figure 1.
Figure 4:
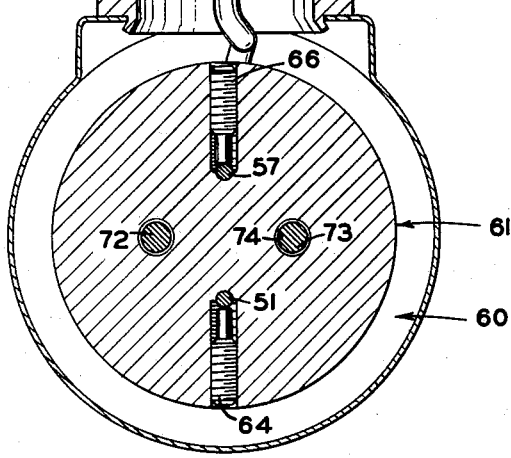
Figure 4 is a sectional view taken on the line IV—IV of Figure 1.

Referring first to Figures 1, 2 and 3, there is shown generally at 1 a valve assembly substantially similar to the valve assembly shown in my application, Serial No. 570,903, and designed for operating in generally the same manner. However, for the purpose of convenience in reference, a brief description of such valve assembly will be set forth herein, together with a full indication of the modifications necessary to embody the present invention.

A housing 2 (Figures 1, 2 and 3) is provided with external ports 3, 4 and 5. A pressure supply conduit is connected to the port 5, a fluid working conduit is connected to the port 3, and an exhaust conduit, if any is used, is connected to the port 4.

A central passageway 6 is provided within said housing, to which the port 3 is directly connected. A pair of end chambers 7 and 8 are provided at each end of the central passageway 6 and in said chambers are located the diaphragms 9 and 11, respectively. The diaphragm 9 is imperforate and divides the end chamber 7 into two non-connecting compartments 12 and 13. An end member 14, hereinafter described in further detail, closes the axially outer end of the end chamber 7 and provides the axially outer wall of the compartment 13. Said end member 14, which holds the diaphragm 9 firmly in place against the shoulder 15, is held in place by means, such as a snap ring 16. A perforated diaphragm 11 divides the end chamber into two compartments 17 and 18, which communicate with each other through the openings 19 in the diaphragm 11. An end member 21 closes the axially outer end of the end chamber 8 and defines the axially outer wall of the compartment 18. The end member 21, which holds the diaphragm 11 firmly in place against the shoulder 22, is held firmly in place by any convenient means, such as a snap ring 23.

The diaphragms 9 and 11 are provided with hubs 26 and 27, respectively, and said hubs are provided with valve surfaces 28 and 29, respectively. Said valve surfaces 28 and 29 bear against the valve seats 31 and 32, respectively, when said hubs are moved axially in an appropriate manner. Communication between the central passageway 6 and the compartment 12 of the end chamber 7 is controlled by the position of the valve surface 28 with respect to the valve seat 31, and communication between the central passageway 6 and the compartment 17 of the end chamber 8 is controlled by the position of the valve surface 29 with respect to the valve seat 32.

A safety ring 50 (Figure 1) encircles the hub 26 within the compartment 12 and has legs 50a which engage the axially inner wall 30 of the compartment 12. The ring 50 (Figure 3) serves to hold the diaphragm 9 away from the edge of the passageway 40, which communicates with the compartment 12 through the wall 30. Said ring 50 is constricted so as to provide adequate clearance between it and the hub 26, both for circulation of pressure fluid and for freedom of movement by said hub.

A central rod 33 (Figure 1) is positioned, preferably coaxially, within the central passageway 6 and functions in part to connect and coordinate the movements of the diaphragms 9 and 11. Flanges 34 and 36 on the rightward (as appearing in Figure 1) part of said rod receive the hub 26 of the diaphragm 9 and hold said diaphragm against axial movement with respect to said rod. Flanges 37 and 38 on the leftward end of said rod receive the hub 27 of the diaphragm 11 and hold said diaphragm against axial movement with respect to said rod. The mutually facing surfaces of the flanges 36 and 37 are beveled to provide substantially continuous extensions of the valve surfaces 28 and 29, respectively, as shown. The port 5 (Figures 1 and 2) communicates, through a passageway 39, with the compartment 17 of the end chamber 8, and the port 4 (Figure 2) communicates, through a passageway 40, with the compartment 12 of the end chamber 7.

Thus far, the structure described is substantially that shown in my application, Serial No. 570,903, and forms no independent portion of the present invention, but has been set forth primarily for the purpose of convenient reference. Attention is now directed to the valve operating device 60, which comprises the present invention and which operates the valve assembly 1.

The rightward end member 14 (Figure 1), which becomes a part of the operating device 60, is provided with a central, axially extending boss 41 having a central, blind opening 42 arranged for slidably receiving the rightward end of the rod 33. A sealing member 43 may be provided in operative association with the rod 33 within the opening 42. The rightward end of the rod 33 terminates with respect to the rightward wall of the opening 42 to provide a chamber 44, for purposes appearing hereinafter. A central passageway 46 is provided within the rod 33 connecting said chamber 44 with the compartment 18 of the leftward end chamber 8.

A first passageway 47 (Figure 1), which connects the chamber 44 with the compartment 13 of the end chamber 7, is shaped to provide a valve seat 48 intermediate the ends thereof. A valve 49 is in operative association with said valve seat and is mounted on a valve rod 51, which is slidably supported, and sealed with respect to the boss 41, by a suitable cup ring 52. A second passageway 53 communicates between a point, such as in atmosphere located outside of the valve housing, and the compartment 13, and includes a valve seat 54 intermediate its ends. A valve 56 is in operative association with said valve seat 54 and is mounted on a valve rod 57, which latter is supported upon, and in slidable relation with, a cup ring 58 which also seals said valve rod with respect to the boss 41.

A valve actuating member or disk 61 (Figure 1) is spaced from the boss 41 and receives the rightward ends of the rods 51 and 57 into suitable openings 62 and 63, respectively, therein. Suitable means, such as set screws 64 and 66, are provided for holding the valve rods 51 and 57 firmly and immovably with respect to the actuating disk 61.

A first electromagnetic coil 67, preferably having an iron core 68, is provided at the rightward side of the actuating disk 61, and a second electromagnetic coil 69, preferably having an iron core 71, is provided at the leftward side of the actuating disk 61. Said electromagnetic coils and their cores may be held in position in any convenient manner, one suitable construction being shown in Figure 5 wherein connecting assembly bolts 72 and 73, mounted in, or tapped into, the boss 41, extend through suitable openings 74 in the actuating disk 61 and openings 76 in an end holding wall 77 and carry nuts 78 at their ends for bearing against said wall 77. Conductors 82 and 83 (Figure 1) connect the electromagnetic devices 67 and 69 to suitable sources of electrical potential, preferably D.C. potential.

Said electromagnetic coils 67 and 69, and their respective cores, are spaced apart a distance only slightly greater than the axial length of the actuating disk 61 so that the movement of said disk, from a position where it contacts one core to a position where it contacts the other core, will be very small, on the order of 0.009 to 0.023 inch in a valve having ports approximately ½ inch in diameter and said valve being approximately 3.0 inches in diameter. Hence, the devices applying force onto the actuating disk 61, referring particularly to the electromagnetic devices 67 and 69, can be relatively small and will still exert ample force on said disk 61 to effect a satisfactory operation of the pilot valves.

*Operation*

The operation of the valve assembly of the device is set forth in substance in my application, Serial No. 570,903, and, hence, will be reviewed here only briefly, for convenient reference.

Pressure fluid introduced in port 5 travels through port 39 and apertures 19 in diaphragm 11 into compartment 18 of the end chamber 8. If the valve is in the position shown in Figure 1, the pressure of such fluid is imposed on the leftward side of the hub 27 and on the leftward end flange surface 38a of the rod 33. Because there is not an equal opposing force on the rightward side of the hub 27, the valve is firmly held in the rightward position, as shown in Figure 1, and thereby prevents the passage of such pressure fluid from the port 5 to the port 3.

If the valve rod 33, and the structure associated therewith, should be in the leftward position, so that the valve surface 28 bears against the valve seat 31, other pressure relationships are created, which will become apparent as the description proceeds, by which the valve is held in its leftward position. Thus, the fluid pressure tends to hold the valve in whichever position it occupies at a given time, and the electromagnetic devices are energized only to change such position.

When the valve is in the position shown in Figure 1, pressure fluid within the pressure cylinder C, to which the valve 1 is connected to control, can pass through the port 3, thence between the valve seat 31 and the valve surface 28 to the exhaust port 4 (Figure 2), thereby exhausting the pressure cylinder C.

If the conductors 82 are now energized, with the valve rightwardly, as shown, the electromagnetic device 67 will be energized and the actuating disk 61 will be moved rightwardly, thereby opening the valve 49 and closing the valve 56. This will permit pressure fluid to flow from the passageway 46 through the chamber 44 and through the passageway 47 into the compartment 13. With the valve 56 closed, said pressure fluid will be held in the compartment 13. This, since the compartment 12 is still connected to the low pressure side of the system, and since the diaphragm 9 has no openings corresponding to the openings 19, will create a leftward force on the rod 33, overriding the rightward force applied at the leftward side of the hub 27 and, thus, effect an immediate leftward movement of the rod 33. This will close the valve surface 28 tightly against the valve seat 31 and move the valve surface 29 away from the valve seat 32. Pressure fluid continues to pass from the pressure port 5 through the passageways 46 and 47 into the compartment 13 and, thus, continues to hold said valve in the leftward position. In this position, pressure fluid from the pressure port 5 also passes through the passageway 39 into the compartment 17 and thence past the surfaces 32 and 29 into the central passageway 6. Being stopped by the valve surface 28, which is held tightly against the seat 31, the pressure fluid passes through the outlet port 3 to the cylinder C.

With the pressure fluid from the compartment 13 bearing against the leftward side of the valve 56, said valve will be held firmly against the valve seat 54 and this acts, through the actuating disk 61, to hold the valve 49 away from the valve seat 48. Thus, the electromagnetic device 67 can be deenergized immediately upon the completion of the rightward movement of the actuating disk 61, and the pressure system will continue to hold the pilot valves in their rightward position and thereby continue to hold the valve rod 33 and its associated parts in their leftward positions indefinitely.

Now, if the electrical conductors 83 are energized, the electromagnetic device 69 will be energized and the actuating disk 61 will be moved leftwardly, thereby closing the valve 49 and opening the valve 56. This terminates the supply of pressure fluid to the compartment 13 and releases to the low pressure side of the system the pressure fluid which has been in the compartment 13. This removes the leftward acting force from the diaphragm 9 and thereby permits the impact pressure of the fluid in the passageway 6 to act on the leftward side of the diaphragm 9, whereby the valve parts are moved rightwardly into the position shown in Figure 1. A spring 45 may be added, as shown in Figure 1, to assist the rightward movement of the rod 33, if desired, but in practice this has been found to be unnecessary. This terminates the flow or pressure fluid from the port 5 to the outlet port 3, but again permits any pressure fluid within the cylinder C to enter the port 3, pass between the surfaces 28 and 31 into the compartment 12 and thence out the port 4 (Figure 2) to the low pressure side of the system.

However, pressure from the compartment 18, passing through the passageway 46 and through the chamber 44 into the passageway 47, will continue to act on the valve 49 to urge it leftwardly against the valve seat 48. This acts, through the actuating disk 61, to hold the valve 56 away from the seat 54 and, thereby, the pressure fluid from the inlet port 5 is utilized to hold the pilot valves in their leftward position. Thus, as soon as the leftward movement of the actuating disk 61 is completed, the energization of the electromagnetic device 69 may be terminated.

Thus, only a momentary pulse of electrical energy is required to open or to close the valve and, immediately upon the completion of such an opening or closing movement, the electrical supply can be terminated, with its various resultant obvious advantages.

Figure 5:
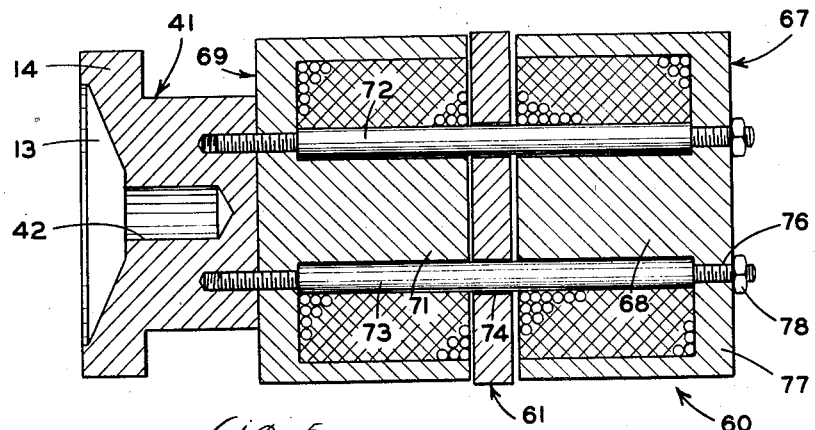
Figure 5 is a sectional view taken on the line V—V of Figure 1.
Figure 6:
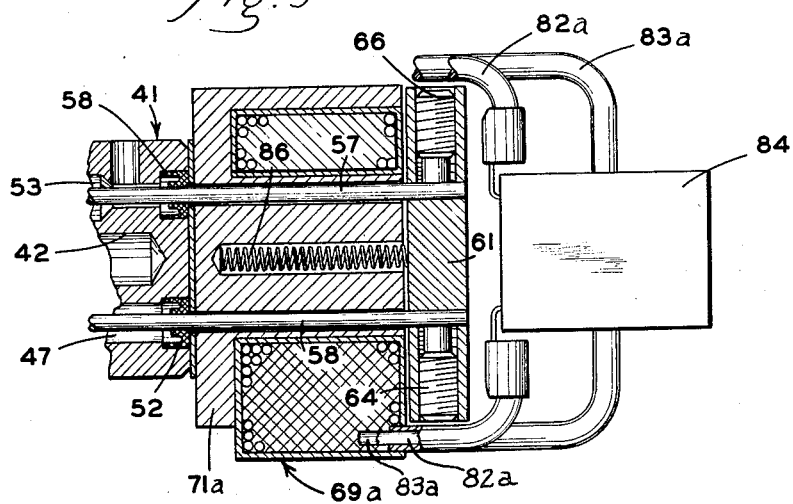
Figure 6 is a fragment of Figure 1, showing a modified construction wherein one of the electromagnetic elements is replaced by a spring.

Referring now to Figure 6, a spring 86 is provided in place of the electromagnetic device 67 of Figure 5. Said spring 86 constantly urges the actuating disk 61 in a predetermined direction, such as rightwardly as appearing in Figure 6, and the electromagnetic device 69a must be of sufficient strength to overcome said spring and pull the actuating disk 61 leftwardly upon energization of the electrical conductors 82a and 83a.

Thus, the valve may be held in a normally closed position, but may be opened upon application of electrical energy to the electromagnetic device 69a, although here it will be necessary to continue application of such electrical energy for so long as it is desired to hold said valve open. Termination of the energization of the electromagnetic device 69a will permit the spring 86 to resume control, move the actuating disk 61 rightwardly and again effect closing of the valve in the manner above described in connection with the embodiment shown in Figure 1.

Figure 8:
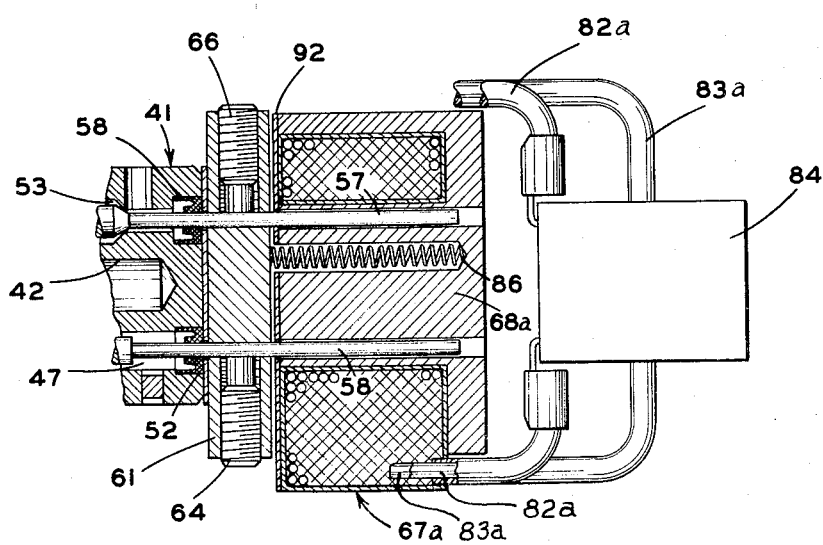
Figure 8 is a fragment of Figure 1, showing a modified construction similar to that shown in Figure 5.

It will be evident, in view of this, that the position of the spring 86 and the electromagnetic device 69a may, in this embodiment, be reversed, as shown in Figure 8, and the valve thereby held open by the spring and closed upon application of electrical energy to the electromagnetic device. A rectifier 84 (Figures 6 and 8) may be placed in series with the electromagnetic device or coil 69a or the electromagnetic device or coil 67a and a commercial A.C. source by means of the conductors 82a and 83a. Thus, said coils are energized by a pulsating direct current, which has been found far more effective in energizing the electromagnetic windings than is the A.C. source itself.

It has been found that the coils 67 and/or 69 may develop accumulations of permanent magnetism after a substantial number of operations at a high frequency. Thus, where only one such core 68a or 71a (Figures 6 and 8) is used in combination with a spring 86, such core may eventually tend to hold onto its respective actuator 61 after its respective coil has been deenergized. This undesirably delays the operation of the valve. By placing a wafer 92 of silicon steel (Figure 8) against the core 68a (or the core 71a) between it and the actuator 61, such accumulation is prevented.

Figure 7:
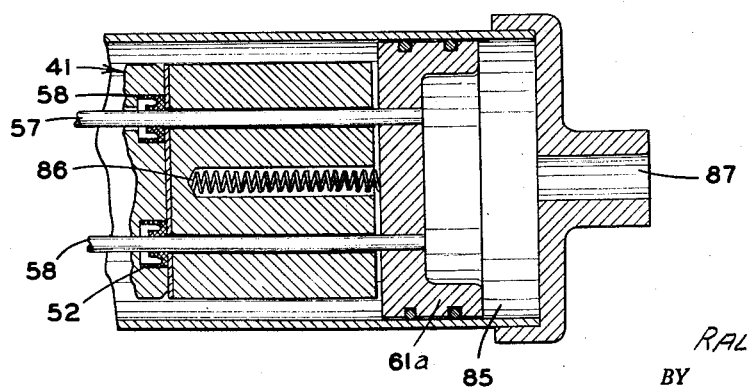
Figure 7 is a fragment of Figure 1, showing a further modified construction wherein the electromagnetic windings are replaced by pressure fluid means.

Referring to Figure 7, there is shown a further possible variation in which the actuating disk 61 of Figure 1 becomes the piston 61a of a pressure fluid system. As shown, the spring 86 is still used to urge the piston 61a constantly rightwardly and a pressure, applied through the conduit 87, is then utilized to move the piston 61a leftwardly against said spring 86 in response to an externally applied control. Thus, the spring 86 here constantly urges the valve into closed position and said valve may be opened by application of pressure fluid, as desired, through the conduit 87 and into the chamber 85.

It will be obvious, in view of the foregoing, that pressure fluid could, if desired, also be applied to both sides of the actuating disk 61 or piston 61a for opening or closing the valve in a manner analogous to the operation of the electromagnetic devices 67 and 69, or the positions of the pressure fluid chamber 85 and the spring 86 may, for other applications, be reversed so that the spring 86 normally urges the valve leftwardly into its open position and the application of pressure fluid will move the valve rightwardly into its closed position.

Figure 9:
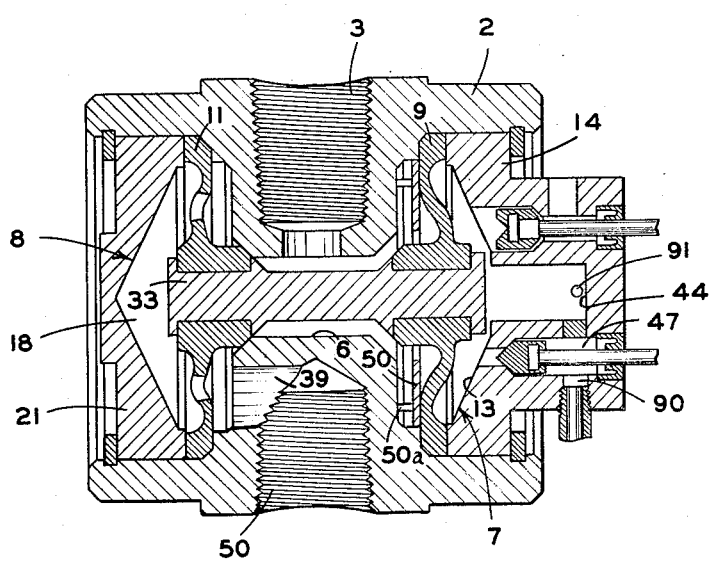
Figure 9 is a fragment of Figure 1, showing a modified valve assembly.

It may be desirable, under some circumstances, to use the valve assembly 1 to control the flow of one type of pressure fluid, while operating said valve assembly with another type of pressure fluid. In such case, the valve assembly is modified as shown in Figure 9. Specifically, the valve rod 33 is solid and a passageway 90 is provided through the housing 2 for communication with the pilot valve passageway 47. The passageway 90 is connectible to any convenient source of pressure fluid, not shown. A bleed opening 91 may be provided between the chamber 44 and atmosphere to prevent vacuum and pressure locks therein. With a valve assembly as shown in Figure 9, it is possible to control the flow of a liquid through the valve assembly, while using a gas to control the operation of the valve assembly.

It will be evident that many other variations in the types and arrangement of controls, including the use of a mechanical control, may be provided for moving the actuating disk 61 rightwardly or leftwardly, as desired, with resulting actuation of the valve parts as above described. Those here specifically illustrated and described should, therefore, be recognized as illustrative only and not considered as limiting, except where the claims expressly so provide.

It will be apparent that the variations above specifically described, together with others which will be apparent to persons acquainted with the field here concerned, may be readily utilized in connection with the valve and control structure of the invention, and the specific forms herein disclosed should be recognized as being for illustrative purposes and no intention to limit should be implied therefrom, except as the claims hereinafter appended expressly provide.

I claim:

1. In a power actuated valve, the combination comprising: a housing having a high pressure port, a low pressure port and an exhaust port; valve means within said housing for selectively connecting said high pressure port and said low pressure port, and connecting said low pressure port and said exhaust port, said means including a slidable valve rod occupying one position when said high pressure port is connected to said low pressure port and occupying a second position when said low pressure port is connected to said exhaust port, said rod having a passageway centrally therethrough and means providing constant communication from said high pressure port to said central passageway; driving means for effecting movement of said rod, said driving means including a chamber which, when pressurized, will cause said rod to move into said one position and, when depressurized, will cause said rod to move into said second position; a first control passageway establishing communication from said central passageway into said chamber; a second control passageway establishing communication from said chamber to the low pressure side of said pressure system; a first pilot valve in said first control passageway and a second pilot valve in said second control passageway, said pilot valves being related to each other such that, when either thereof is closed, the other is open; an actuator and means connecting said pilot valves to said actuator; force-applying means on opposite sides of said actuator, at least one of which is subject to external control for moving said actuator in response to said external control and thereby effecting simultaneous opening and closing movements of said respective pilot valves; whereby, when said first pilot valve is open, pressure fluid introduced into said chamber will effect movement of the valve rod into one position and, when said first pilot valve is closed and said second pilot valve is open, said pressure fluid may be exhausted from said chamber to permit the valve rod to occupy said second position.

2. In a power actuated valve, the combination comprising: a housing having a high pressure port, a low pressure port and an exhaust port; valve means within said housing for selectively connecting said high pressure port and said low pressure port, and for connecting said low pressure port and said exhaust port, said valve means including a slidable valve rod occupying one position when said high pressure port is connected to said low pressure port and occupying a second position when said low pressure port is connected to said exhaust port; driving means for effecting movement of said rod, said driving means including a chamber which, when pressurized, will cause said rod to move into said one position and which, when depressurized, will cause said rod to move into said second position, a fluid pressure source; a first control passageway connecting said source and said chamber; a second control passageway connecting said chamber to exhaust; a first pilot valve in said first control passageway and a second pilot valve in said second control passageway, said pilot valves being related to each other such that, when either thereof is closed, the other is open; an actuator and means connecting said pilot valves to said actuator; a plurality of force applying means for moving said actuator, at least one of said force applying means being subject to external control whereby said actuator may be moved in response to external control and thereby effect simultaneous opening and closing movements of said pilot valves so that when said first pilot valve is open and said second pilot valve is closed, pressure fluid is introduced into said chamber to effect movement of said valve rod into one of said positions and, when said first pilot valve is closed and said second pilot valve is open, said pressure fluid may be exhausted from said chamber to permit said valve rod to occupy said second position.

3. The device defined in claim 2, wherein said actuator is of magnetic material and of generally disk-shape, and the force-applying means are electromagnetic devices.

4. The device defined in claim 2, wherein said actuator is of magnetic material and is of generally disk-shape, one of said force-applying means is an electromagnetic device and the other of said force-applying means is a constantly distorted resilient device.

5. The device defined in claim 2, wherein at least one of said force-applying means is a pressure fluid cylinder and its actuator constitutes a piston within said cylinder.

6. The device defined in claim 2, wherein said control passageways each have a portion positioned parallel to the axis of movement of said rod and said pilot valves are located within said portions, and including, also valve rods positioned parallel to each other and connecting said pilot valves to said actuator.

7. The device defined in claim 2, wherein said valve means includes, also, spaced chambers and a passageway connecting said chambers, each of said chambers being divided by a flexible diaphragm, the peripheries of which diaphragms are affixed to the walls of said chambers and the central portions of which diaphragms are arranged on, and around, said rod at spaced points thereon for controlling the connection between said ports.

8. In a power actuated valve, the combination comprising: an elongated housing having first, second and third ports; valve means within said housing for selectively connecting said first and second ports, and for connecting said second and third ports, said valve means including a slidable valve rod for occupying one position when said first port is connected to said second port and occupying a second position when said second port is connected to said third port; driving means for effecting movement of said rod, said driving means including a pair of axially spaced chambers, said rod extending into said chambers; means in said chambers connected to said rod and movable in response to fluid pressure therewithin to thereby effect movement of said rod; a passageway connecting said first port to one of said chambers whereby fluid pressure may be applied to move said rod in one direction; a fluid pressure source; a first control passageway connecting said source to the other chamber; a second control passageway connecting said other chamber to exhaust; a first pilot valve in said first control passageway and a second pilot valve in said second control passageway, said pilot valves being related to each other such that, when either thereof is closed, the other is open; an actuator and means connecting said pilot valves to said actuator; a plurality of force applying means for moving said actuator, at least one of said force applying means being subject to external control whereby said actuator may be moved in response to external control and thereby effect simultaneous opening and closing movements of said pilot valves so that when said first pilot valve is open pressure fluid is introduced into said other chamber to effect movement of said valve rod into one of said positions and, when said first pilot valve is closed and said second pilot valve is open, said pressure fluid may be exhausted from said other chamber to permit said valve rod to occupy said second position.

9. In a power actuated valve the combination comprising: an elongated housing having inlet, outlet and exhaust ports; valve means within said housing for selectively connecting said inlet and outlet ports, and for connecting said outlet and exhaust ports, said valve means including a slidable valve rod for occupying one position when said inlet port is connected to said outlet port and occupying a second position when said outlet port is connected to said exhaust port; driving means for effecting movement of said rod, said driving means including a pair of axially spaced chambers, said rod extending into said chambers; means in said chambers connected to said rod and movable in response to fluid pressure therewithin to thereby effect movement of said rod; a passageway connecting said inlet port to one of said chambers whereby fluid pressure may be applied to move said rod in one direction; a fluid pressure source; a first control passageway connecting said source and the other chamber; a second control passageway connecting said other chamber to exhaust; a first pilot valve in said first control passageway and a second pilot valve in said second control passageway, said pilot valves being related to each other such that, when either thereof is closed, the other is open; an actuator ring of magnetizable material and means connecting said pilot valves to said actuator; a plurality of force applying means for respectively moving said actuator in opposite directions, at least one of said force applying means consisting of an electromagnetic coil; means for guiding movement of said actuator ring toward and away from one axial end of said coil, energization of said electromagnetic coil being responsive to external control whereby said actuator ring may be moved in response to external control to thereby effect simultaneous opening and closing movements of said pilot valves so that when said first pilot valve is open, pressure fluid is introduced into said other chamber to effect movement of said valve rod into one of said positions and, when said first pilot valve is closed and said second pilot valve is open, said pressure fluid may be exhausted from said other chamber to permit said valve rod to occupy said second position.

10. A power actuated valve according to claim 9 including a ring of silicon steel between said one axial end of said coil and the adjacent surface of said ring for rapidly demagnetizing said coil when current flowing therethrough is terminated.

11. A valve construction, comprising: an elongated housing, said housing including means defining a pair of longitudinally spaced chambers, one of said chambers being closed at its remote end and the other of said chambers being open at its remote end; a perforated diaphragm within and extending transversely across said one chamber and mounted on said housing for flexing movement toward and away from the other chamber; an imperforate diaphragm within and extending transversely across said other chamber and mounted on said housing for flexing movement toward and away from said one chamber; a passageway connecting the adjacent ends of said chambers and having oppositely facing valve seats formed at the ends thereof; said housing having three ports formed therein, one of said ports communicating with said passageway and the other two of said ports respectively communicating with said chambers adjacent said valve seats; a valve rod extending through said passageway into said chambers and connected to said diaphragms, said diaphragms having valve elements thereon sealingly engageable with said valve seats; controllable means for supplying fluid pressure to said other chamber through the remote end thereof, said fluid pressure acting on said imperforate diaphragm to urge the valve rod in one axial direction, the fluid pressure admitted into said one chamber through the port connected thereto acting on both sides of said perforate diaphragm.

12. A valve construction according to claim 11 wherein said valve rod has an axially extending passageway therethrough communicating at one end thereof with said one chamber; said fluid pressure supply means including a further chamber communicating with the other end of said valve rod passageway; and valve means between said further chamber and said other chamber.

13. A valve construction according to claim 11 including valve means between said fluid pressure supply means and said other chamber; an actuator ring of magnetizable material connected for actuating said valve means; and an electromagnet coil positioned adjacent said ring whereby energization of said coil will effect attraction of said ring and thereby cause actuation of said valve means.

References Cited in the file of this patent

UNITED STATES PATENTS

| | | |
|---|---|---|
| 425,202 | Blanchard | Apr. 8, 1890 |
| 1,611,961 | Thompson | Dec. 28, 1926 |
| 2,409,517 | Schmit | Oct. 15, 1946 |
| 2,724,398 | Higgins et al. | Nov. 22, 1955 |